United States Patent [19]

Yamazaki et al.

[11] 4,009,938
[45] Mar. 1, 1977

[54] LIQUID CRYSTAL DISPLAY DEVICE

[75] Inventors: Yoshio Yamazaki, Shimosuwa; Toshihiro Suzuki; Sadao Kanbe, both of Suwa, all of Japan

[73] Assignee: Kabushiki Kaisha Suwa Seikosha, Tokyo, Japan

[22] Filed: Dec. 6, 1973

[21] Appl. No.: 422,373

[30] Foreign Application Priority Data

Dec. 6, 1972  Japan .................. 47-122164

[52] U.S. Cl. .................. 350/160 LC; 252/299
[51] Int. Cl.² .................. G02F 1/13; C09K 3/34
[58] Field of Search .................. 252/408 LC, 299; 350/160 LC

[56] References Cited
UNITED STATES PATENTS

| | | | |
|---|---|---|---|
| 3,773,747 | 11/1973 | Steinstrasser | 252/408 LC |
| 3,795,436 | 3/1974 | Boller et al. | 252/408 LC |
| 3,796,479 | 3/1974 | Helfrich et al. | 252/408 LC |
| 3,815,972 | 6/1974 | Hsieh | 252/408 LC |
| 3,816,336 | 6/1974 | McCaffrey et al. | 252/408 LC |
| 3,923,857 | 12/1975 | Boller et al. | 252/299 |
| 3,960,752 | 6/1976 | Klanderman et al. | 252/299 |

FOREIGN PATENTS OR APPLICATIONS

| | | | |
|---|---|---|---|
| 814,291 | 8/1974 | Belgium | 252/299 |
| 2,024,269 | 12/1971 | Germany | 252/299 |
| 4,978,683 | 7/1974 | Japan | 252/299 |

OTHER PUBLICATIONS deJeu, W. H., Van der Veen, J., Philips Res. Repts., vol. 27, pp. 172–185 (Apr. 1972).

Primary Examiner—Benjamin R. Padgett
Assistant Examiner—T. S. Gron
Attorney, Agent, or Firm—Blum, Moscovitz, Friedman & Kaplan

[57] ABSTRACT

A liquid crystal display device uses nematic liquid crystal compounds having a high positive dielectric anisotropy for rotating the plane of polarized light. The optical activity of a composition including such materials can be eliminated by impressing a sufficiently high voltage across a cell containing such materials. These properties make it possible to use such compositions as the basis of a device which is, in effect, an optical shutter.

10 Claims, 2 Drawing Figures

LIQUID CRYSTAL DISPLAY DEVICE

BACKGROUND OF THE INVENTION

It has been found that if two transparent plates are each rubbed in a single direction and the two plates are mounted opposite each other with the directions of rubbing at right-angles to each other and with the rubbed surfaces facing each other, and that if the space between the plates is filled with a liquid composition having a sufficiently high concentration of a nematic liquid material having a sufficiently high positive dielectric anisotropy, then such a cell has the property of rotating the plane of polarized light falling thereon by 90°. Furthermore, if a sufficiently high electric field is imposed across such a cell, then the optical activity of the cell is decreased to zero for the period during which the voltage is imposed. When the voltage is removed or cut below the threshold voltage then the optical activity of the cell is restored.

Placing a polarizer plate at one face of the cell and an analyzer plate at the other converts the system into an electrically driven optical shutter. If the axes of the polarizer and analyzer plates are parallel, then in the absence of a suitable electrical field, no light will be transmitted through the device. Conversely, if the axes of the polarizer and analyzer plates are at right-angles to each other, then light will be transmitted through the device only in the absence of an electric field.

Simple as the device appears to be in principle, a number of difficulties arise in attempting to make a practical system. Materials having high positive dielectric anisotropy tend to be colored, so that if they are used in high concentration the system will transmit little light even when the "shutter" is open. Further, it is necessary that the nematic liquid crystal composition have a mesomorphic phase range which includes room temperature, else it will be difficult to utilize the device. Also, the nematic liquid crystals must be stable under the conditions of use and the composition should have a low threshold voltage. It is particularly to be desired that the threshold voltage be no greater than 3.0 volts thus making it possible for a two-cell battery to operate the system. Moreover, the electrical resistivity of the system must be high in order to avoid exhausting the power source too rapidly.

SUMMARY OF THE INVENTION

Phenyl esters of para-substituted benzoic acid, where the phenyl group is substituted in the para position with a nitrile group have been found to have high positive dielectric anisotropy. Examples are

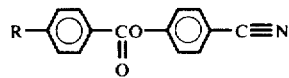

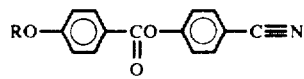

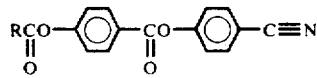

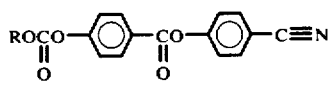

where R is a normal alkyl group.

To extend the mesomorphic phase of these compounds downwardly, they are mixed with one or more nematic liquid crystal compounds having an azoxy group.

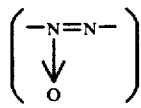

therein where the selected azoxy compounds have a low transition temperature between the crystalline and mesomorphic phase. The azoxy compounds are yellow in color and have a negative dielectric anisotropy ranging from 0 to −0.3.

The azoxy compounds lower the transition temperature sufficiently so that in combination with the nitrile esters the composition can be used at room temperature. Furthermore, the positive dielectric anisotropy of the nitrile esters is so high that when diluted with the requisite quantity of nitrile ester, the resultant composition can still have a positive dielectric anisotropy high enough so that the threshold voltage is quite low. Both types of material are stable.

For imposing an electric field across the composition of sufficient intensity, transparent, electrically-conductive coatings are deposited on the inner surfaces of the transparent plates prior to rubbing. These coatings of preselected shape are selectively connectable to an exterior source of voltage.

A polarizer plate and an analyzer plate are placed on opposite sides of the cell formed by the two rubbed plates. If the axes of the polarizer and analyzer plates are parallel to each other, then the device prevents transmission of light therethrough when no field is applied to the electrically-conductive coatings. When a field of sufficient intensity is placed across the composition, then the system transmits plane polarized light. The converse is true if the polarizer and analyzer plates are positioned so that their axes are at right angles to each other.

Accordingly, an object of the present invention is an improved electrically-driven optical shutter using nematic liquid crystals in a combination such that the threshold voltage for operation is low and the system is stable.

Yet another object of the present invention is an improved liquid crystal display device applicable to instruments such as portable electronic desk calculators, wrist watches, timepieces of larger size than wrist watches, thermometers, cameras and research devices.

An important object of the present invention is an improved electrically-driven optical shutter requiring so low a voltage for operation and consuming so little current as to make same readily portable.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
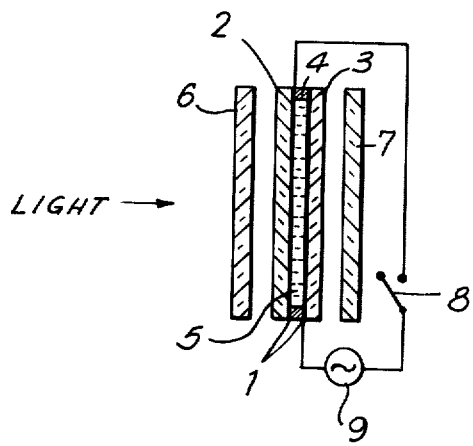
FIG. 1 shows diagrammatically in cross-section a device in accordance with the present invention.

The operation of a device in accordance with the present invention depends upon dielectric anisotropy which is defined as the difference between the dielectric constant in the direction parallel to the molecular axis of the material under consideration and the dielectric constant perpendicular to the molecular axis of the liquid crystal under consideration. In other words, ($\Delta\epsilon = \epsilon_{\parallel} - \epsilon_{\perp}$)

A nematic liquid crystal material having positive dielectric anisotropy is one in which delta epsilon is greater than 0 and one having a negative dielectric anisotropy is one in which the delta epsilon is less than 0. Generally, in a compound having a positive dielectric anisotropy, the transition temperature from crystal to liquid crystal phase is high. Also, combining compounds of positive dielectric anisotropy does not decrease the transition temperature sufficiently so that room temperature is included in the mesomorphic temperature range. However, we have found a group of nematic liquid crystal compounds which have a low phase transition temperature and a relatively low negative dielectric anisotropy which can be mixed with selected compounds of positive dielectric anisotropy to give a composition which includes room temperature in its mesomorphic temperature range and which yet has a net positive dielectric anisotropy. These compounds are all azoxy compounds having the following structural formulas, where the letters R and R' are alkyl groups which will be defined below:

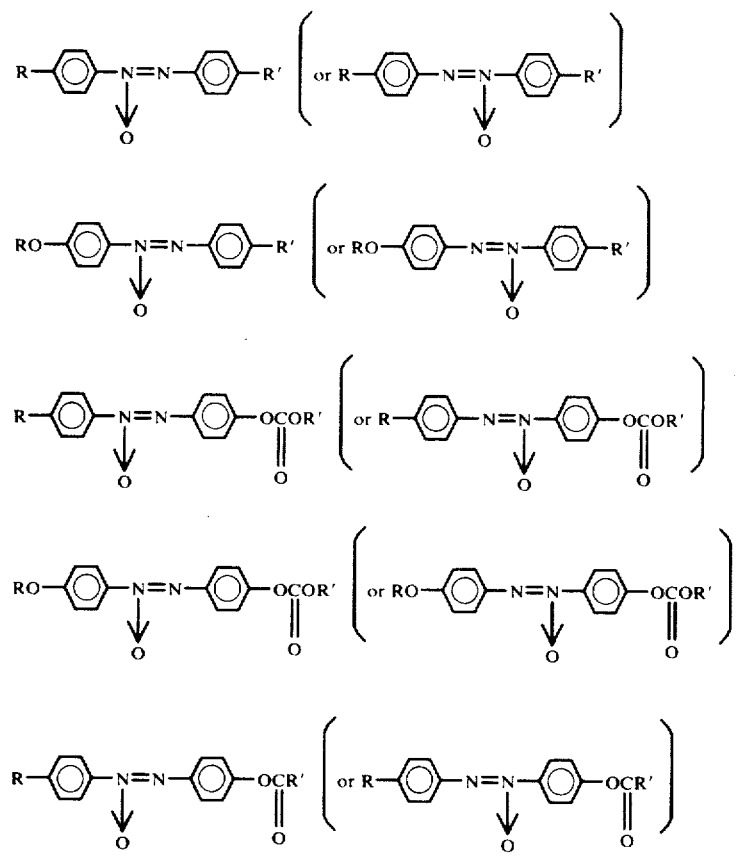

where R or R' is alkyl it may have 2–7 carbon atoms, where it is part of an alkoxy group it may have 1–2 carbon atoms and where it is part of an acyloxy group it may have 4–7 carbon atoms.

It will be noted that the structural formulas presented immediately above are shown in pairs; the two types of compounds shown in each pair are position isomers with respect to each other insofar as the location of the oxygen atom joined to one of the nitrogen atoms is concerned.

The method of synthesis of these azoxy compounds may be such that both isomers are usually formed. This is particularly the case when the pair of compounds is prepared by oxidation of the corresponding azobenzene. However, tests have shown that corresponding position isomers or a mixture thereof in any proportions have essentially the same effect when mixed with a nitrile both so far as the resultant dielectric anisotropy and the mesomorphic range are concerned. Consequently, throughout the remainder of the present specification and the claims as well, the description of a single azoxy isomer shall be read as describing two compounds which are isomeric with respect to the position of the azoxy oxygen and the mixture thereof in any proportions.

A group of nitriles, all of which are nematic liquid crystals having high positive dielectric anisotropy and suitable for use with the aforenoted azoxy compounds are shown in the Summary of the Invention. R is a normal alkyl group. It will be noted that each of the compounds is a phenyl benzoate in which both benzene groups are substituted in the para position.

The azoxy compounds have a low transition temperature between the crystalline and mesomorphic phases. It is possible to form liquid crystal compositions having a broad liquid crystal phase near room temperature by mixing from 2 to 4 compounds.

The azoxy compounds have a yellow color, and have a negative dielectric anisotropy which is quite low; the anisotropy $\Delta\epsilon$ equals 0 to $-0.3$ except for the compound

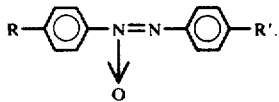

The benzoates have a large dipole moment due to the nitrile radical ($-C \equiv N$) which lies in the direction of the molecular axis. As a result, nematic liquid crystals including the nitrile radical have a large dielectric anisotropy which is, as aforenoted, positive.

As is known, a thin layer of a liquid crystal material having a negative dielectric anisotropy can be used in a variety of display cells because of the fact that it scatters light when an electric field is applied in a transverse direction. This phenomenon is believed to be due to light scattering in the domain of the liquid crystal molecular group by current carriers in the liquid crystal layer. Conversely, nematic liquid crystal material having a positive dielectric anisotropy has the property that the direction of the molecular axis thereof will orient itself in parallel with an electric field applied transversely to a layer of such a material.

It has been found that when an electrode consisting, for instance, of a transparent plate having a transparent electroconductive material on one surface thereof is rubbed on that surface with a material such as cotton, and brought in contact with a nematic liquid crystal of positive dielectric anisotropy such as in a liquid crystal cell filled with such a material, the molecular axes of such liquid crystals will orient themselves in parallel with the rubbing direction. Naturally, for such a phenomenon to be observed, the direction of rubbing must be unidirectional.

This phenomenon can be utilized by sealing between two plates of glass coated with a transparent conductive material a nematic liquid crystal of high positive dielectric anisotropy. In the construction of such a cell, the rubbed faces or the inner faces of the two plates comprising the cell and the directions of rubbing of the two faces are transverse to each other, i.e. at right angles to each other. As a result, the nematic liquid crystal molecules adjacent to the surfaces of the two plates will be at right angles to each other and the molecules between the plates will orient themselves in positions such that there is a gradual transition, or twist in going from one plate to the other. As a result, if plane-polarized light is passed through such a cell, the plane of polarization is rotated by 90°.

When such a cell is put between two polarizing plates where the axes of the polarizing plates are parallel, then, in the absence of an electric field, no light will be transmitted through the cell. However, the construction of the cell is such that the coatings on the inner surfaces of the liquid crystal cells can be connected to a source of voltage. Assuming that the voltage imposed across the liquid crystal cell is above a certain threshold voltage, a matter which will be discussed in detail below, then the liquid crystal composition in the cell will lose its optical activity and the combination of parallel polarizer and analyzer plates and liquid crystal cells will become transparent to the plane-polarized light beam. As is obvious, the effect of change in the electric field can be reversed by positioning the axes of the polarizer and analyzer plates at right angles to each other.

An extremely important facet of such a device is that the power consumption is extremely low. As a result, it is possible to apply such a display device to virtually every type of instrument, including portable electronic calculators, wrist watches, table clocks, thermometers, etc. The specific resistance of liquid crystal materials used in display devices which depend on light-scattering when an electric field is imposed, these being the liquid crystals which have a negative dielectric anisotropy, is about $10^{10}$ohm cm. However, the specific resistivity of the liquid crystals having a positive dielectric anisotropy as described herein is greater than $10^{11}$ ohms cm, so that the power consumption is lower by a factor of at least 10. Moreover, the threshold voltage required for operation is, in virtually all cases less than 6 volts, and for some of the compositions described herein, less than 3 volts, as the result of which a 2-cell battery is adequate for driving the display. This type of display is particularly applicable to solid-state electronic wrist watches using a quartz oscillator and MOS integrated circuits.

A sectional view of the liquid crystal display device in accordance with the present invention is shown in FIG. 1. Transparent electrodes 2 and 3 are each coated on the inner surfaces thereof with a conductive film 1 of tin oxide or similar transparent electrically conductive material. Preferably, the conductive film consists of segments which can be selectively activated for the display of indicia such as numerals or letters. The cell is sealed by means of an insulating spacer 4 around the periphery thereof. Suitable spacers are polyesters, etc. The thickness of the spacer is preferably between 5 and 20$\mu$. Polarizing filters 6 and 7 are placed on either side of the cell. Lead wires are taken out from the conductive film 1 and connected to an electric source 9 through a switch 8.

Installation of an irregular reflector behind polarizing filter 7 converts the display device into a reflection type.

A device in accordance with the present invention has the following advantages:

1. The temperature range over which the device can be used is wide and includes room temperature. In fact, compositions are given herein which can be used at temperatures as low as $-5°$ C.

2. Compositions are available which operate at threshold voltages below 3.0 so that a 2-cell battery can be used for driving the device without the necessity for a booster circuit.

3. The display provided by such a device is clear and sharp.
4. The compositions enumerated herein are stable and long-lived even in the presence of traces of moisture which strongly degrade the life of prior types of liquid crystal display cells.

Liquid crystal compositions having a wide temperature range of use and which are optically active are prepared by using at least one compound having positive dielectric anisotropy and a low melting point and a nematic liquid crystal having as low a phase transition temperature as possible.

Figure 2:
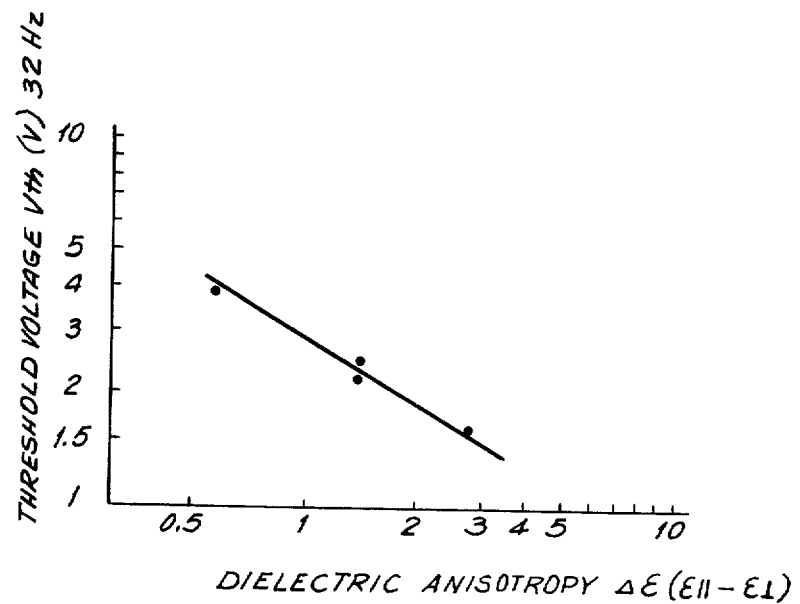
FIG. 2 is a graph of the threshold voltage necessary for operation of a device in accordance with the present invention vs. the dielectric anisotropy of the nematic liquid crystal composition used in said device.

To prepare compositions having a low threshold voltage it is desirable that the positive dielectric anisotropy of the composition be as great as possible. However, most nematic liquid crystals having positive dielectric anisotropy have relatively high melting points, making them unsuitable for use at low temperatures. Consequently it is preferable to use a material of positive dielectric anisotropy which has a relatively low transition temperature between the crystalline and mesomorphic phase. Generally, the relation between the threshold voltage $V_{th}$ and the dielectric anisotropy $\Delta\epsilon$ is expressed by the formula $$V_{th} = \pi \sqrt{k/\Delta\epsilon}$$

in which $k$ is a constant. Experimental results obtained by the inventors are given in FIG. 2. From this Figure, it can be seen that a display device in accordance with the present invention will operate at a voltage as low as 3.0 provided the composition has a dielectric anisotropy, $\Delta\epsilon$ larger than 0.9. In preparing a liquid crystal composition for use in a device of the present invention, it is desirable that the composition be as nearly colorless as possible. This is especially important since the system operates by means of polarized light, which means that at least 50% of the incident light must be absorbed by the polarizer plates. Azo compounds (—N=N—) are stable against moisture and have long life but have a relatively strong orange color tone. Consequently, they are unsuitable for most uses. Another possibility is the group of nematic liquid crystal compounds having the azomethine group (—CH=N—) which suffers from the disadvantage that it is strongly affected by small amounts of moisture which may enter the cell.

The novel liquid crystal compositions satisfy all of the requirements given in the above tabulation. Examples of azoxy benzenes and of cyanophenylbenzoates and their transition temperatures are given in Table 1. Examples of compositions using at least one member of each of these groups are given in Table 2 together with their temperature characteristics and the threshold voltage at 32Hz.

Table 1

| Compound | temperature characteristic (° C) |
|---|---|
| P-P'-di-n-butyl-azoxybenzene $\left( \text{n-H}_9\text{C}_4-\bigcirc-\underset{\underset{O}{\downarrow}}{N=N}-\bigcirc-\text{C}_4\text{H}_9 \right)$ | C $\underset{19.5}{\rightleftarrows}$ N $\underset{33.5}{\rightleftarrows}$ I |
| P-, P'-di-n-pentyl-azoxybenzene $\left( \text{n-H}_{11}\text{C}_5-\bigcirc-\underset{\underset{O}{\downarrow}}{N=N}-\bigcirc-\text{C}_5\text{H}_{11} \right)$ | C $\underset{29}{\rightleftarrows}$ N $\underset{68}{\rightleftarrows}$ I |
| P-, P'-di-n-hexyl-azoxybenzene $\left( \text{n-H}_{13}\text{C}_6-\bigcirc-\underset{\underset{O}{\downarrow}}{N=N}-\bigcirc-\text{C}_6\text{H}_{13} \right)$ | C $\underset{27}{\rightleftarrows}$ N $\underset{55}{\rightleftarrows}$ I |
| P-methoxy, P'-n-butylazoxybenzene $\left( \text{H}_3\text{CO}-\bigcirc-\underset{\underset{O}{\downarrow}}{N=N}-\bigcirc-\text{C}_4\text{H}_9, \text{H}_3\text{CO}-\bigcirc-\underset{\underset{O}{\downarrow}}{N=N}-\bigcirc-\text{C}_4\text{H}_9 \right)$ | C $\underset{21}{\rightleftarrows}$ N $\underset{75}{\rightleftarrows}$ I |

Table 1-continued

| Compound | temperature characteristic (°C) |
|---|---|
| P-methoxy-P'-ethylazoxybenzene | C ⇌ 37 ⇌ N ⇌ 71 ⇌ I |
| $\left[H_3CO-\bigcirc-N=N(\downarrow O)-\bigcirc-C_2H_5, H_3CO-\bigcirc-N=N(\downarrow O)-\bigcirc-C_2H_5\right]$ | |
| P-ethyl, P'-caproyloxyazoxybenzene | C ⇌ 47 ⇌ N ⇌ 77.5 ⇌ I |
| $\left[H_5C_2-\bigcirc-N=N(\downarrow O)-\bigcirc-O-\underset{O}{\overset{\|}{C}}-C_5H_{11}, H_5C_2-\bigcirc-N=N(\downarrow O)-\bigcirc-O\underset{O}{\overset{\|}{C}}C_5H_{11}\right]$ | |
| P-n-propyl, P'-heptanoyloxy-azoxybenzene | C ⇌ 32 ⇌ N ⇌ 88 ⇌ I |
| $\left[n\text{-}H_7C_3-\bigcirc-N=N(\downarrow O)-\bigcirc-O-\underset{O}{\overset{\|}{C}}-C_6H_{13}, n\text{-}H_7C_3-\bigcirc-N=N(\downarrow O)-\bigcirc-O\underset{O}{\overset{\|}{C}}C_6H_{13}\right]$ | |
| P-n-butyl, P'-cyanophenylbenzoate | C →66.5→ I; N →42; triangle |
| $\left(n\text{-}H_9C_4-\bigcirc-COO-\bigcirc-C\equiv N\right)$ | |
| P.-n-pentyl, P'-cyanophenylbenzoate | C →61.5→ I; N →58.5; triangle |
| $\left(n\text{-}H_{11}C_5-\bigcirc-COO-\bigcirc-C\equiv N\right)$ | |
| P-n-Pentylcarbonate, P'-cyanophenylbenzoate | C →74→ I; N →61; triangle |
| $\left(m\text{-}H_{11}C_5O\cdot CO_2-\bigcirc-COO-\bigcirc-C\equiv N\right)$ | |
| P-n-hexylcarbonate, P'-cyanophenylbenzoate | C ⇌ 48 ⇌ N ⇌ 77 ⇌ I |
| $\left(n\text{-}H_{13}C_6O-CO_2-\bigcirc-COO-\bigcirc-C\equiv N\right)$ | |
| P-n-heptanoyloxy-P'-cyanophenylbenzoate | C →85.5→ I; N →54; triangle |

Table 1-continued

| Compound | temperature characteristic (° C) |
|---|---|
| (H₁₃C₆COO—⌬—COO—⌬—C≡N) | |

The preferred cyanophenylbenzoates for use in preparing the liquid crystal compositions may be selected from compounds having the following structural formulas:

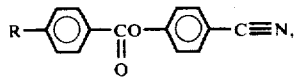

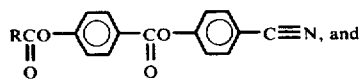

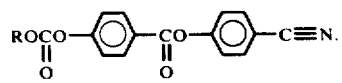

Where R is alkyl it may have 3–6 carbon atoms, where it is part of an acyloxy group it may have 4–7 carbon atoms, and where it is part of an alkyl carbonate group it may have 4–7 carbon atoms.

possible to use a wide range of nematic liquid crystals therewith.

So far as the azoxy compounds are concerned it is desirable to select compounds having a low transition temperature from the crystalline to the mesomorphic phase and having a wide mesomorphic temperature range. Also, the $\Delta\epsilon$ quantity should be small, especially when negative. The dielectric anisotropies are 0.2 and −0.2 respectively for P-,P'dialkylazoxybenzene and about −0.2 in P-alkoxy, P'-alkylazoxybenzene. Using 20 weight per cent of the compound with the positive $\Delta\epsilon$ in combination with the cyanophenylbenzoates, the resultant compositions have a $\Delta\epsilon$ of 2 to 3 and a threshold voltage which is below 2 volts, so that, as aforenoted, it is possible to construct the display device using only two cells and without need for a boosting circuit. Moreover, with the relatively small quantity of the cyanophenylbenzoate, the composition has a light yellow color so that it is highly transparent. Stated in another way, the thin layer of the compositions exemplified herein absorb only in a small region of visible light. In this way, such a display device shows a clear

Table 2

| Composite (weight ratio) | (° C) temperature characteristic | (V) 32 Hz threshold voltage |
|---|---|---|
| Composite composed of P-methoxy-P'-n-butylazoxybenzene and P-n-butyl-P'-cyanophenylbenzoate in 8 : 2 | C ⇌ 10 N ⇌ 63 I | 1.7 |
| Composite composed of P-methoxy-P' n-butylazoxybenzene and P-, P'-di-n-butyl-azoxybenzene and P-n-pentyl-P' cyanophenylbenzoate in 4 : 4 : 2 | C ⇌ −5 N ⇌ 53 I | 1.7 |
| Composite composed of eutectic mixture of P-methoxy-P'-n-butyl-azoxybenzene and P-methoxy-P'-ethyl-azoxybenzene, and P-n-hexylcarbonate-P'-cyanophenyl-benzoate in 8 : 2 | C ⇌ −2 S ⇌ 6.5 N ⇌ 72 I | 1.9 |
| Composite composed of P-methoxy-P'-n-butylazoxybenzene, P-, P'-di-n-butyl azoxybenzene, P-n-pentyl-P'-cyanophenyl benzoate, and P-n-hexylcarbonate-P'-cyanophenylbenzoate in 3.4 : 3.0 : 1.6 : 2.0 | C ⇌ 3 N ⇌ 58.5 I | 1.6 |

Note:
C indicates crystal, S indicates smectic, N indicates nematic and I indicates isotropic liquid.
The ratio of the two compounds forming the eutectic mixture is 5.2 : 2.8.

Note: C indicates crystal, S indicates smectic, N indicates nematic and I indicates isotropic liquid.
The ratio of the two compounds forming the eutectic mixture is 5.2:2.8.

In general, nematic liquid crystal compositions have a tendency to supercool below the lower transition point so that the compositions as exemplified in Table 2 can frequently be used at temperatures even lower than specified in the Table. The dielectric anisotropy of the compounds listed are very substantial; $\Delta\epsilon$ is about 14 and about 13 respectively in P-n-alkyl-P'-cyanophenylbenzoate and P-alkylcarbonate-P'-cyanophenylbenzoate. These are unusually high values, making it and strong contrast. Moreover, the molecules of the two types presented herein can tolerate a small amount of moisture without decomposition. Further, it is not necessary to provide filters for protecting the liquid crystal from deterioration or degradation by light.

Following are compositions which also have been found useful:

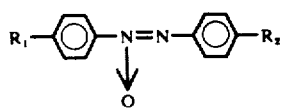

(1)

with $R_1$ and $R_2$ alkyl radicals of 2-7 carbon atoms;

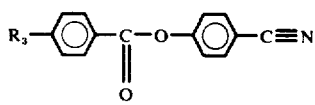

with $R_3$ being an alkyl radical of 3-6 carbon atoms;

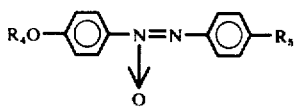

where $R_4$ is an alkyl radical of 1-2 carbon atoms and $R_5$ is an alkyl group having 1-3 carbon atoms.
2. P,P'-dialkylazoxybenzene with alkyl radicals having 2-7 carbon atoms;
P-alkylcarbonate-P'-cyanophenylbenzoate with an alkyl radical having 4-7 carbon atoms;
P-alkoxy, P'-alkyl azoxybenzene with an alkoxy radical having 1-2 carbon atoms and an alkyl radical having 2-7 carbon atoms.
3. P-alkoxy, P'-alkylazoxybenzene, with said alkoxy group having 1-2 carbon atoms and said alkyl group having 2-7 carbon atoms;
P-alkyl, P'cyanophenylbenzoate with said alkyl group having 3-6 carbon atoms.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal display device having a low-threshold voltage for altering the transit of polarized light therethrough comprising two opposed transparent plates, unidirectionally-oriented transparent electrodes on the inner faces of said plates, the directions of orientation of said electrodes differing by about 90°, said electrodes being connectable to a voltage source, polarizing filters disposed at the outer surfaces of said plates and a nematic liquid crystal composition between said plates, said composition comprising a first compound having the structural formula

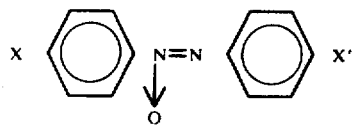

where X and X' are selected from the group consisting of alkyl radicals having 2-7 carbon atoms, alkoxy radicals having 1-2 carbon atoms and acyloxy radicals having 4-7 carbon atoms in the alkyl portions thereof and a second liquid crystal compound having the formula

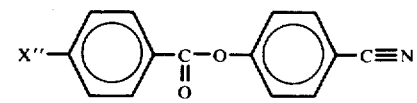

where X'' is selected from the group consisting of alkyl radicals having 3-6 carbon atoms and acyloxy radicals and alkyl carbonate groups having 4-7 carbon atoms in the alkyl portions thereof.

2. A liquid crystal display device as defined in claim 1 wherein said first compound is

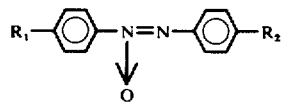

with $R_1$ and $R_2$ alkyl radicals of 2-7 carbon atoms, said second compound is

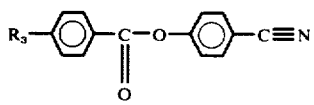

with $R_3$ being an alkyl radical of 3-6 carbon atoms and further comprising a third compound having the structure

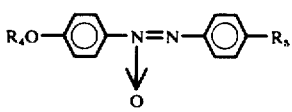

where $R_4$ is an alkyl radical of 1-2 carbon atoms and $R_5$ is an alkyl group having 1-3 carbon atoms.

3. A liquid crystal display device as defined in claim 1 wherein said first compound is a P,P'-dialkylazoxybenzene, with alkyl radicals having 2-7 carbon atoms, and a second compound is a P-alkylcarbonate-P'-cyanophenylbenzoate with an alkyl radical having 4-7 carbon atoms and further comprising a P-alkoxy, P'-alkyl azoxybenzene with an alkoxy radical having 1-2 carbon atoms and an alkyl radical having 2-7 carbon atoms.

4. A liquid crystal display device as defined in claim 1 wherein said first compound is a P-alkoxy, P'-alkylazoxybenzene, with said alkoxy group having 1-2 carbon atoms and said alkyl group having 2-7 carbon atoms and said second is a P-alkyl, P'cyanophenylbenzoate with said alkyl group having 3-6 carbon atoms.

5. A liquid crystal display device as defined in claim 1 comprising a composite of P-methoxy-P'-n-butylazoxybenzene and P-n-butyl-P'-cyanophenylbenzoate in the weight ratio of 8:2.

6. A liquid crystal display device as defined in claim 2 comprising a composite of P-methoxy-P'-n-butylazoxybenzene and P-,P'-di-n-butyl-azoxybenzene and P-n-pentyl-P'-cyanophenylbenzoate in the weight ratio of 4:4:2.

7. A liquid crystal display device as defined in claim 1 wherein said first compound is P-methoxy-P'-n-butyl-azoxybenzene, and said second compound is P-n-hexyl-carbonate-P'-cyanophenylbenzoate and further comprising a third compound, p-methoxy-p'ethyl-azoxybenzene, said first and third compounds being present in such quantity relationship that they constitute a eutectic mixture, the weights of said eutectic mixture and said second compound being in the ratio of 8:2.

8. A liquid crystal display device as defined in claim 1 wherein said first compound is P-methoxy-P'n-butylazoxybenzene, and said second compound is P-n-pentyl-P'cyanophenylbenzoate and further comprising a third compound P-,P'-di-n-butylazoxybenzene and a fourth compound p-n-hexylcarbonate -P'-cyanophenylbenzoate, the weights of said compounds having the relationship 3.4:1.6:3.0:2.0.

9. A liquid crystal display device as defined in claim 1 wherein the positive dielectric anisotropy and the quantity of the nitrile in said composition are such that the positive dielectric anisotropy of said composition is at least about 2.

10. A liquid crystal display device as defined in claim 9 wherein the threshold voltage is at most about 3.0 volts.

* * * * *